United States Patent

Negus et al.

Patent Number: 5,163,059
Date of Patent: Nov. 10, 1992

[54] MODE-LOCKED LASER USING NON-LINEAR SELF-FOCUSING ELEMENT

[75] Inventors: Daniel K. Negus, La Honda; Luis A. Spinelli, Sunnyvale; Timothy Johnston, Mt. View, all of Calif.

[73] Assignee: Coherent, Inc., Palo Alto, Calif.

[21] Appl. No.: 697,898

[22] Filed: May 9, 1991

[51] Int. Cl.⁵ .............................................. H01S 3/098
[52] U.S. Cl. ...................................... 372/18; 372/98; 372/107; 372/108
[58] Field of Search .................... 372/18, 98, 107, 108, 372/92, 39

[56] References Cited

U.S. PATENT DOCUMENTS 4,268,800  5/1981  Johnston, Jr. et al. ............. 331/94.5
5,079,772  1/1992  Negus et al. ......................... 372/18

Primary Examiner—Léon Scott, Jr.
Attorney, Agent, or Firm—Limbach & Limbach

[57] ABSTRACT

A passively mode-locked laser (110) is disclosed that includes a resonant cavity (112, 114) having a gain medium (116) therein. A transmissive element (116), which may be the gain medium, is also located in the cavity and is formed from a material which varies the two-dimensional, lateral spatial profile of the beam with respect to intensity due to the Kerr effect. The resonator is arranged such that the round trip gain of the system increases with respect to the intensity of the beam so that mode-locking operation can be achieved. In one approach, the variation in the spatial profile is used to increase the extraction of energy from the gain medium. In another approach, the variation in spatial profile which occurs with an increase in intensity is used to decrease the loss in the system so that pulse operation is favored. In an illustrated embodiment, wherein the gain medium (116) is formed from titanium-sapphire, the self-phase modulation of the crystal is also used to compress the pulses into the femtosecond range. In addition, a prism set (136, 138) can be used to balance the group velocity dispersion and self-phase modulation of the gain crystal to achieve stable, soliton-like operation. In the preferred embodiment, mode-locking behavior is initiating by rotating a transmissive optical element (230, 232) located in the cavity in a manner to vary the path length of the beam.

9 Claims, 12 Drawing Sheets

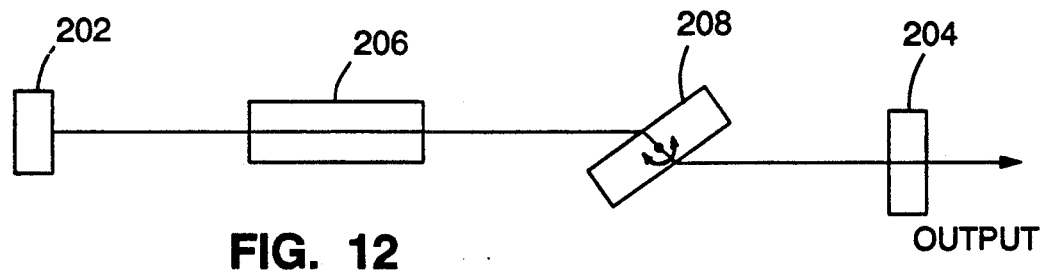
FIG. 12
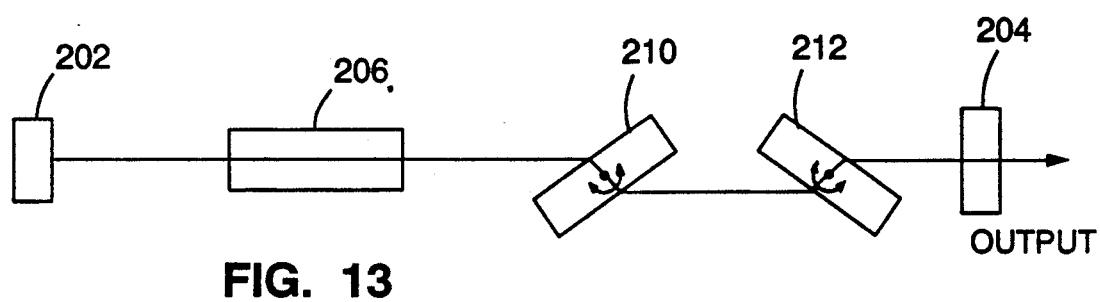
FIG. 13
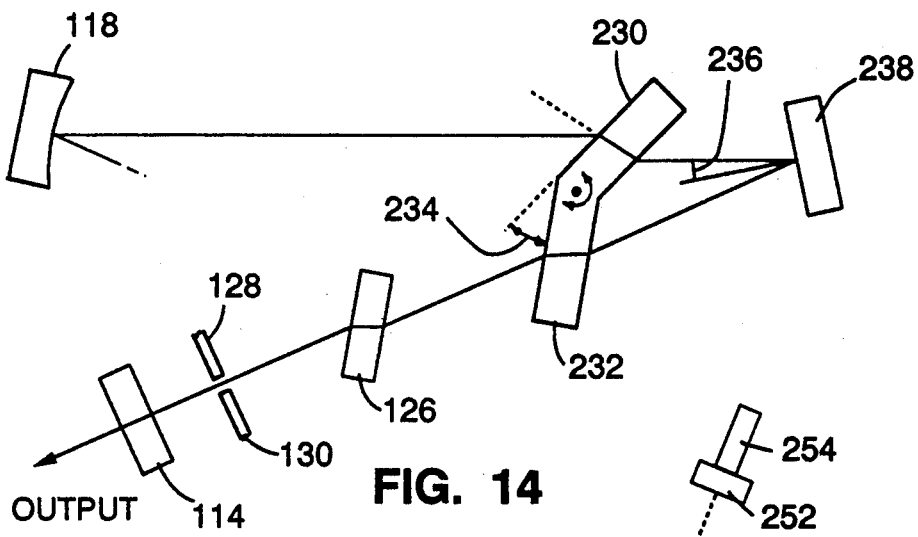
FIG. 14
FIG. 15

MODE-LOCKED LASER USING NON-LINEAR SELF-FOCUSING ELEMENT

TECHNICAL FIELD

The subject invention relates to a passively mode-locked laser and a mechanism for initiating mode-locking behavior.

BACKGROUND OF THE INVENTION

Many schemes have been developed in the prior art for mode-locking lasers. All of the schemes function to phase lock the various longitudinal modes of the laser so that short pulses can be generated. Some schemes include an active element for varying the round trip gain in the resonator and are known as actively mode-locked lasers. Other schemes rely on passive elements. The subject invention falls in the latter category.

The subject invention includes the use of a transmissive element having an index of refraction which varies proportionally with the square of the amplitude of an electric field applied to the element. This phenomenon, generally referred to as the Kerr effect, has been studied and utilized for many years. For example, electric field variations have been used to create Kerr effect polarizers.

The electronic Kerr effect can be induced by the electric field of a light beam and in this case the response time of materials is so fast that it will manifest itself when the light beam passes through the element. There is a significant body of prior art which has reported that the Kerr effect can be used to shape and shorten pulses in a mode-locked laser. This approach is based on the fact that the bandwidth of a pulse can be expanded beyond the gain bandwidth through Kerr effect induced self phase modulation. Once the bandwidth of the pulse has been expanded, its duration can then be compressed by adding an appropriate dispersive delay line. It should be noted that this approach is used to shorten existing pulses which have been created with some other, independent, mode-locking scheme in the laser system.

An additional effect is observed when a laser beam having a nonuniform spatial intensity profile is passed through a material wherein the index of refraction varies with intensity of the electric field of the beam. More specifically, a beam having a nonuniform, two dimensional, lateral, spatial intensity variation will create a nonuniform variation in the index of refraction in the material such that an instantaneous focusing lens is created. This effect is called self-focusing and will self-vary the shape of the beam in proportion to its intensity.

Prior devices have been designed which rely upon Kerr effect self-focusing. For example, self-focusing has been used to create optical bistability. (See, "Optical Bistability Based on Self-focusing," by Bjorkholm et al, *Optics Letters*, Vol. 6, No. 7, July 1981). However, in most cases involving mode-locked lasers, the prior art teaches that spatial self-focusing effects should be minimized to avoid the distortion of the beam. Accordingly, the resonators of most prior art systems which employ Kerr effect elements to compress a pulse were designed to minimize the self-focusing effects. (See, "Intracavity Self-Phase Modulation and Pulse Compression in Mode-Locked Lasers," by von der Linde and Malvezzi, *Applied Physics*, B 37, 1–6 (1975)). In contrast, and in accordance the subject invention, the resonant cavity is configured to take advantage of the variations in the spatial profile in the beam created by self-focusing effects in order to increase the round trip gain of the laser in proportion to intensity (for intensities at or below the critical power) so that mode-locking operation can be produced.

Accordingly, it is an object of the subject invention to provide a new and improved mode-locked laser.

It is another object of the subject invention to provide a mode-locked laser which relies on self-focusing effects generated in a non-linear material.

It is a further object of the subject invention to provide a mode-locked laser which uses self-focusing effects to vary the spatial profile of the beam in response to an increase in intensity in order to increase the extraction of energy from the gain medium.

It is still another object of the subject invention to provide a mode-locked laser which uses self-focusing effects to vary the spatial profile of the beam in response to an increase in intensity in order to reduce the losses in the laser.

It is still another object of the subject invention to provide a passively mode-locked laser.

It is still a further object of the subject invention to provide a simple mode-locking mechanism.

It is still another object of the subject invention to provide a laser wherein the self-focusing which occurs in the gain medium is used to mode lock the laser.

It is still a further object of the subject invention to provide a mechanism for mode-locking a titanium-sapphire laser.

It is still another object of the subject invention to provide a mechanism for reliable initiating mode-locking behavior in a passively mode-locked laser.

SUMMARY OF THE INVENTION

The subject invention includes a laser having a resonant cavity in which is disposed a gain medium. A means for exciting the gain medium is provided to generate a laser beam.

In accordance with the subject invention, a means is provided in the cavity which functions to mode lock the laser based on self-focusing effects. This means includes a transmissive element formed from a non-linear material whose index of refraction varies with respect to the intensity of the laser beam. This element may be a separate element or be defined by the gain medium itself. Since the beam in the laser has a non-uniform intensity distribution, this element will vary the two-dimensional, lateral, spatial profile of the beam.

In accordance with the subject invention, the means is designed such that the round trip gain of the laser will be increased in response to an increase in the intensity of the beam. Round trip gain is defined as twice the difference between the single pass saturated gain and the single pass loss.

This latter result can be achieved in two ways. First, the variation in the spatial profile of the beam can be used to better match the circulating beam to the excited volume created by the pump source in the gain medium so that more energy is extracted. Alternatively, the variation in the spatial profile of the beam in response to the increased intensity can be used to decrease the round trip loss. One method of achieving the latter effect is to include an aperture in the cavity and control the beam parameters such that an increase in intensity will reduce the diameter of the beam at the aperture so that losses through the aperture will be lower when the laser is mode locked.

The subject approach will generate mode-locked pulses when any perturbation to the system creates a sufficient variation in the intensity of the circulating beam. This variation can be induced by a fast perturbation of the alignment and/or length of the cavity which can be created by a sharp movement of a cavity mirror. Other more sophisticated approaches could also be used. For example, an acousto-optic modulator (of the type used to actively mode lock a laser) could be used to create an intensity variation. Once the variation is created, the modulator is turned off and the self-focusing effects will sustain the mode-locking effect.

In the preferred embodiment, a transmissive optical element is placed in the cavity at Brewster's angle. In order to initiate mode-locking behavior, the optical element is rotated in a manner to vary the path length of the beam. Once mode-locking behavior has been initiated, the optical element is returned to Brewster's angle for maximum transmission.

In one of the illustrated embodiments of the subject invention, this approach is used to mode lock a titanium-sapphire laser. In this system, a means for introducing a net negative group velocity dispersion is included in the cavity so that the laser exhibits soliton-like behavior. This operation is extremely stable to many types of perturbations.

Further objects and advantages of the subject invention will become apparent from the following detailed discussion, taken in conjunction with the drawings in which:

BRIEF DESCRIPTION OF THE DRAWINGS

FIG. 12 is a schematic diagram illustrating the use of a rotatable intracavity transmissive optical element for varying the path length of the beam to initiate mode-locking behavior.

FIG. 13 is a schematic diagram similar to FIG. 12 and illustrating the use of a pair of rotatable elements for initiating mode-locking behavior.

FIG. 14 is a schematic diagram of the preferred mechanism for inducing mode-locking behavior using a pair of transmissive optical elements.

FIG. 15 is a schematic diagram illustrating an alternative mechanism for initiating mode-locking behavior that includes a Michelson interferometer geometry.

DETAILED DESCRIPTION OF THE PREFERRED EMBODIMENTS

Figure 1:
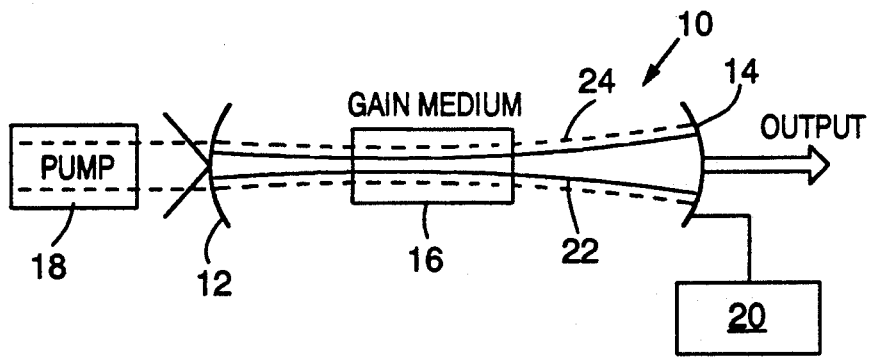
FIG. 1 is a schematic diagram of a laser formed in accordance with the subject invention wherein the gain medium functions as the non-linear material.

Turning to FIG. 1, there is illustrated the basic form of the laser 10 of the subject invention. The laser includes a resonant cavity formed from mirrors 12 and 14. A gain medium 16 is located within the cavity. In this embodiment, the gain medium is formed from a material that will exhibit an intensity dependent index of refraction that is sufficient to vary the two dimensional, lateral, spatial profile of the beam in order to mode lock the laser.

A means, such as another laser 18 is shown as the pump source for exciting the gain medium 16. In FIG. 1, the pump beam is shown entering mirror 12 such that the gain medium is co-linearly pumped. The pump source can also be a laser diode or flashlamp and can be CW or pulsed. The pump source can be mode-locked and pumping synchronously.

Mirror 14 also defines the output coupler for extracting the laser beam. A means (shown schematically as 20) is provided for producing a fast fluctuation in the alignment and/or length of the resonant cavity (by moving mirror 14) to induce a fluctuation in the intensity of the beam which can then be amplified to induce mode-locked behavior. By fluctuation it is meant that there is some increase (spike) in the intensity of the circulating beam. It is believed that scanning the mirror functions to scan a wavelength dependent window of loss through the gain curve such that the fluctuation in intensity of the circulating beam is created.

As noted above, since the beam will have a non-uniform intensity distribution, the self-focusing effects of the gain medium will vary the two-dimensional, lateral, spatial profile of the beam. It should be noted that the variations of the spatial profile of the beam in each of the two axes need not be equal and, in fact, can be much greater in one of the axes than the other. In any case, the laser is designed such that the variations in the spatial profile of the beam when the intensity of the beam is increased, will create an increase in the round trip gain of the system.

In the embodiment shown in FIG. 1, this result is achieved by controlling the parameters of the laser such that when an intensity fluctuation occurs, the circulating beam 22 will extract a greater amount of energy from the excited gain volume. As shown in FIG. 1, the pump beam 24 may have a larger diameter than the circulating beam 22 in the steady state condition. However, when a fluctuation occurs, the self-focusing effects of the gain medium will function to reshape the beam 22 in a manner such that the volume of the excited region and the pump and circulating beam will be better matched and more energy will be extracted. This effect will occur instantaneously in the gain material during each pass of the fluctuation. After a number of passes, the preferential gain will function to suppress the CW operation and create mode-locked pulses. A discussion of the factors to be considered regarding the design of a cavity to meet these criteria are set forth in greater detail below.

Figure 2:
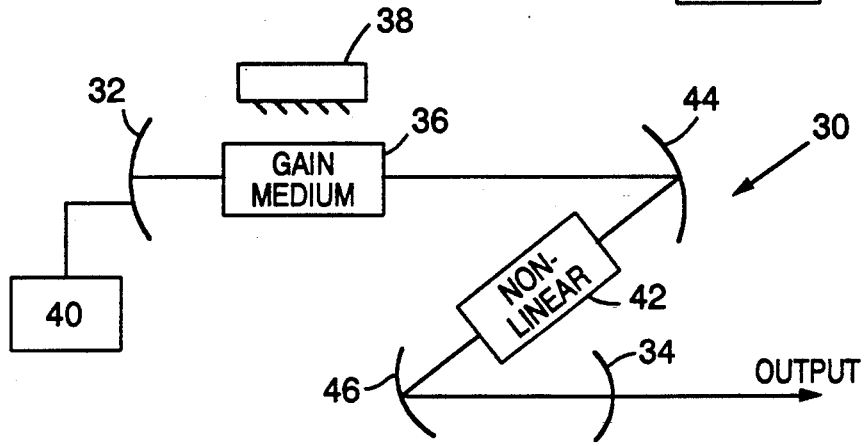
FIG. 2 is a schematic diagram of a laser formed in accordance with the subject invention wherein the non-linear material is a separate transmissive element.

Turning to FIG. 2, there is illustrated another laser system 30 incorporating the subject invention. As in the first embodiment, a resonant cavity is defined between a pair of end mirrors 32 and 34 with mirror 34 acting as the output coupler. A gain medium 36 is located within the resonator and is excited by a pump source which could be, for example, a flashlamp 38. A means (shown schematically at 40) is provided to induce a fluctuation in the intensity of the beam.

In accordance with this embodiment, the non-linear self-focusing effect is provided by a separate transmissive element 42. The use of a separate element would be desirable if the self-focusing effects in the gain medium where insufficient to allow a resonator to be configured to create the mode-locking effect. An advantage to the latter approach is that element 42 can be located in a focusing branch of the resonator. The focusing branch is defined by mirrors 44 and 46. The extra mirrors provide more degrees of freedom in designing the self-focusing effect into the resonator mode.

Except for the addition of the separate non-linear element 42, the operation of the laser of FIG. 2 is the same as in FIG. 1. More specifically, the laser would be designed such that the variation in the spatial profile of the beam in response to an increase in intensity would function to increase the energy extraction from the excited volume in the gain medium 38.

Figure 3:
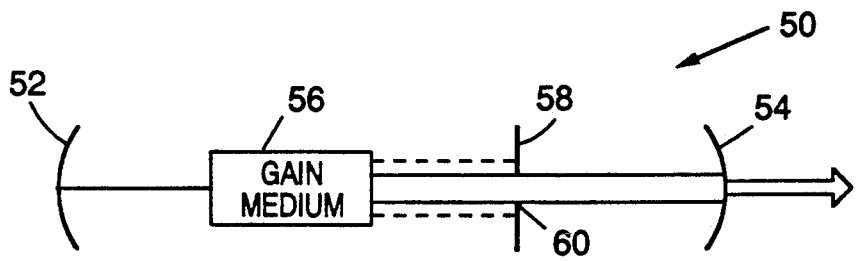
FIG. 3 is a schematic diagram of a laser formed in accordance with the subject invention wherein the gain medium functions as the non-linear material and an aperture is used to add losses to the system.

Turning to FIG. 3, there is illustrated the first of two embodiments wherein the loss in the laser is reduced during an increase in intensity of the beam. The laser 50 includes a resonant cavity defined by mirror 52 and output coupler 54. A gain medium 56 is located in the cavity and is pumped by a suitable source (not shown). In this embodiment, the gain material functions as the non-linear optical element as in the FIG. 1 embodiment.

In accordance with this embodiment, a plate 58 having an aperture 60 is provided. The resonator is designed such that when the laser is operated in the CW mode, the two dimensional, lateral, spatial profile of the beam has a diameter greater than the aperture 60 so that the plate will impose a loss factor on the system. The resonator parameters are further designed so that the self-focusing which occurs in the gain medium during an increase in beam intensity will function to reduce the diameter of the beam at the aperture 60, so more of the energy will pass therethrough. By this arrangement, a pulse of increased intensity will experience a lower loss (or more round trip gain as defined above). After repeated passes within the resonator, the CW operation will be suppressed and only the mode-locked, pulsed operation will exist. The aperture 60 can be either circular, elliptical or a simple slit depending upon the exact nature of the difference in profile between the cw mode and the mode-locked mode.

Figure 4:
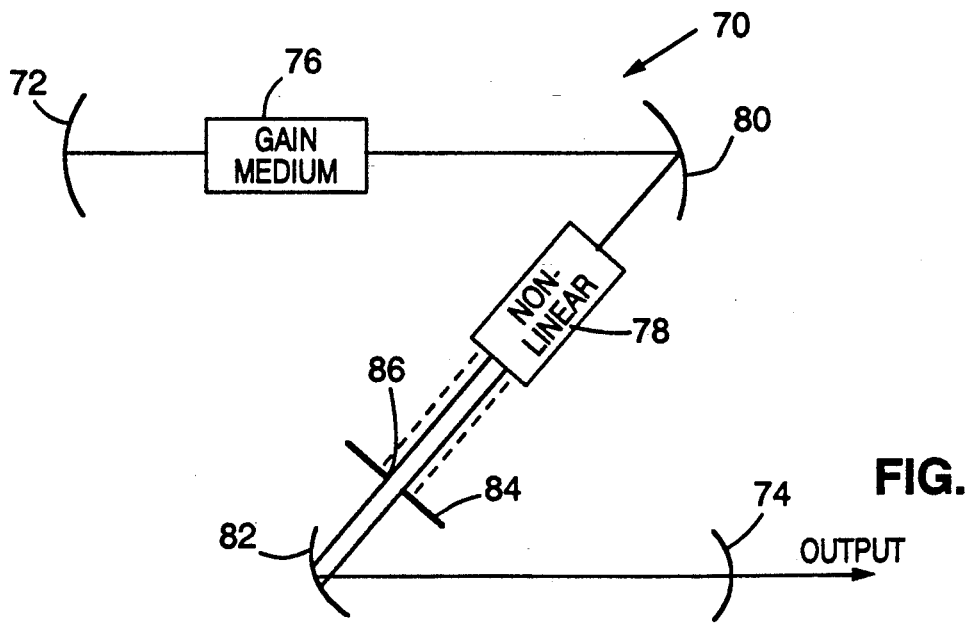
FIG. 4 is a schematic diagram of a laser formed in accordance with the subject invention wherein the non-linear material is a separate transmissive element and wherein an aperture is used to add losses to the system.

FIG. 4 illustrates a laser 70 which operates in a manner similar to the embodiment in FIG. 3. The laser 70 includes a resonator defined by mirror 5 72 and output coupler 74. A gain material 76 is located within the resonator and is pumped by a suitable source (not shown). In this embodiment, the non-linear self-focusing effect is performed by a separate transmissive element 78. As in the embodiment illustrated in FIG. 2, the non-linear element 78 is located in a focusing branch of the resonator. Mirrors 80 and 82 provide the added degrees of freedom in designing the resonator so that the proper self-focusing effect can be more easily achieved.

As in the embodiment of FIG. 3, the laser further includes a plate 84 having an aperture 86. Once again, the resonator parameters are designed such that when the laser is operated in the CW mode, the diameter of the circulating beam is larger than the diameter of the aperture 86 creating a loss. The laser is also arranged such that the self-focusing which occurs in the gain medium during an increase in beam intensity will function to reduce the diameter of the beam at the aperture to reduce the losses.

Figure 5:
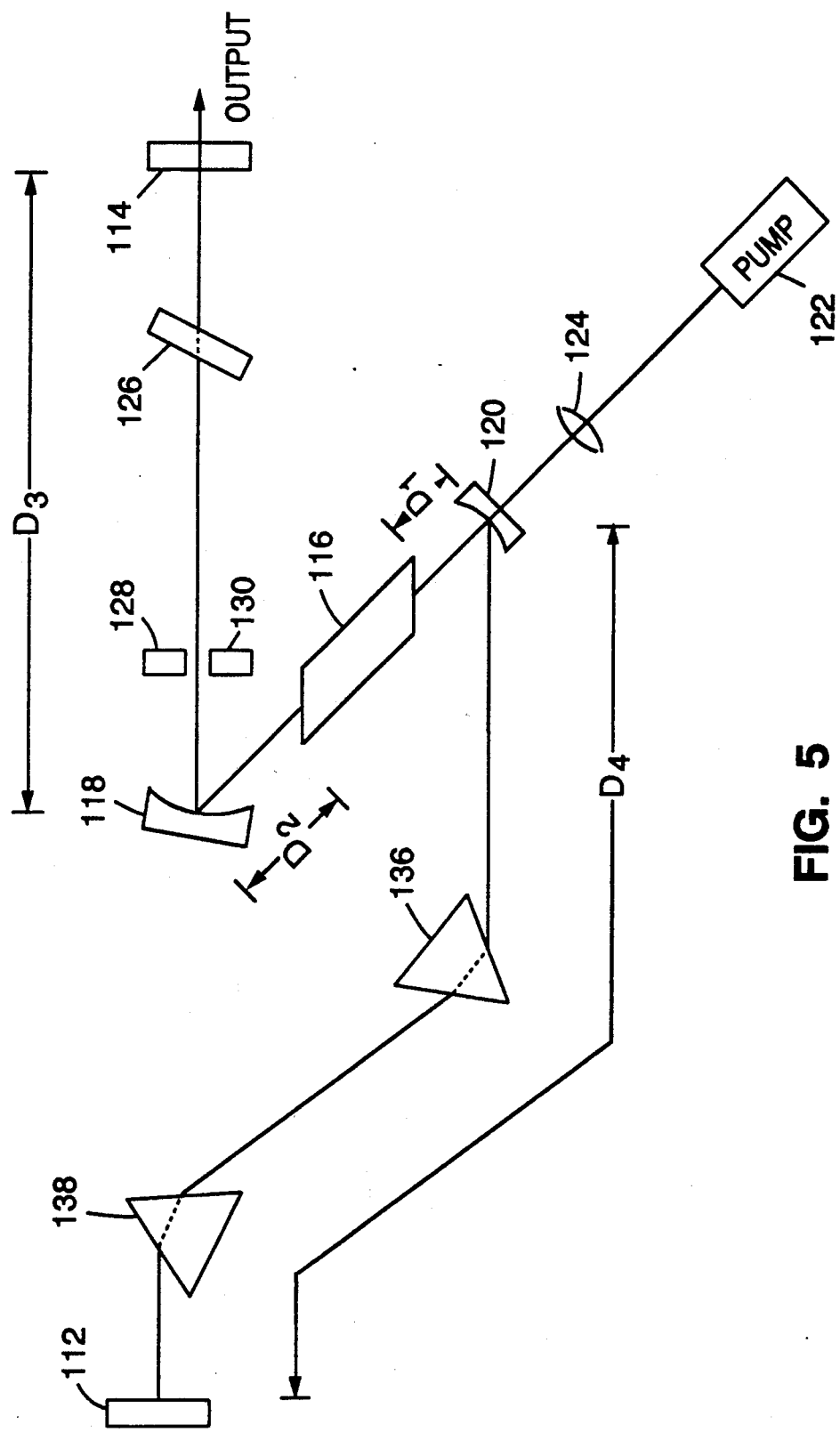
FIG. 5 is a schematic diagram of a laser formed in accordance with the subject invention including a gain medium formed from titanium-sapphire.

FIG. 5 illustrates a laser system 110 formed in accordance with the subject invention and which has been successfully operated to generate stable, femtosecond, soliton-like pulses. This laser 110 includes a resonant cavity defined by a high reflective mirror 112 and an output coupler 114. A gain medium 116 defined by a 22 mm rod formed from titanium-sapphire ($Ti:Al_2O_3$) is located in a focusing branch of the resonator. The focusing branch is defined by a pair of spherical mirrors 118 and 120 each having a radius of curvature of 15 cm. The spacing $D_1$ between mirror 120 and the rod 116 is 75.0 cm. The spacing $D_2$ between the rod and mirror 116 is 77.0 cm. The spacing $D_3$ between mirrors 114 and 118 as well as the spacing $D_4$ between mirrors 112 and 120 is 860 cm.

The rod is co-linearly pumped with from an 8 Watt, CW argon laser 122. The pump light is coupled into the cavity by a lens 124. Such co-linear pumping causes an astigmatic thermal lens to develop which must be considered for stability. These considerations are described in greater detail in copending application Ser. No. 07/527,013, filed May 22, 1990, incorporated herein by reference. The cavity further includes a satellite-free birefringent filter 126 of the type described in copending application Ser. No. 07/361,395, filed June 5, 1989 and incorporated herein by reference. The birefringent filter is provided for tuning the wavelength of the output beam. The BRF filter 126 is located 66 cm from mirror 118.

In accordance with the subject invention, the resonator is designed such that self-focusing which takes place in the titanium-sapphire rod 116 will vary the two dimensional, lateral, spatial profile of the beam in a manner such that the round trip gain is increased over some range when the intensity of the beam increases. In this laser, the round trip gain is increased using both the approaches described above. More particularly, the resonator is designed such that the change in spatial profile of the beam within the rod that occurs from an intensity fluctuation will result in an improved mode match with the excited volume in the gain medium such that increased energy can be extracted and gain is increased.

In addition to increasing the gain, a plate 128 having an approximately 2 mm slit 130 is provided for decreasing the loss in response to the intensity fluctuation. The plate is located 5 cm from mirror 118. The resonator parameters are also designed such that the diameter of the beam at the plate 128 is reduced during an intensity fluctuation so that more of the light will pass through the aperture 130.

As noted above, in order to initiate the mode-locking operation from the CW operation, some fluctuation in the intensity of the beam must be introduced. In the experimental arrangement, this fluctuation has been induced by moving one of the resonator mirrors 112 or 114. A sufficient perturbation can be created by physically tapping one of the mirrors. Initiation has also been achieved by mounting a PZT (not shown) to one of the mirrors and scanning its position so that the alignment and/or length of the resonator is varied. As noted above, this perturbation only has to create a single transient and then the laser will begin to favor pulsed, mode-locked operation.

A more complex and possibly more reliable result could also be achieved with an acousto-optic device mounted in the resonator. If such a device were used to create the initial fluctuation, it can than be turned off. In initial experimentation, it has been found that an AO modulator which provides less than one percent modulation in the gain is sufficient to reliably induce mode-locking behavior. AO modulators which function at this level are relatively inexpensive.

Other mechanisms for initiating mode-locking behavior are discussed below with reference to FIGS. 12 through 15. The mechanism illustrated in FIG. 14 is being utilized in the commercial embodiment of the subject invention.

As noted above, the self-focusing effects of the gain medium are used to establish the mode-locked operation. It is also believed that the frequency domain, self-modulation effects of the non-linear material contribute to the compression of the pulses into the femtosecond regime. The latter effect is similar to that used in the prior art lasers discussed above, which included a separate mechanism to establish the mode-locked operation.

It has also been found that soliton-like pulse shaping can be achieved if a means for creating a net negative group velocity dispersion is included in the resonator. As shown in FIG. 5, this means can include a pair of prisms 136 and 138 having a nominal spacing of 60 cm. The prisms can be formed of SF10. By varying the spacing between the prisms and the optical path length of the beam passing through the prisms, the amount of group velocity dispersion within the cavity can be varied. Frequency and time domain soliton-like pulse formation is discussed in greater detail below.

In the subject laser, the titanium sapphire crystalline gain medium contributes both positive group velocity dispersion and self-phase modulation. The prism set is used to compensate for these effects and produce a net negative group velocity dispersion in the cavity. Balancing the group velocity dispersion with self-phase modulation to achieve stable, soliton-like operation is well known in dye lasers and has been observed in titanium-sapphire lasers which contain flowing saturable absorber solutions. (See, "Soliton-like Pulse Shaping in cw Passively Mode-Locked Ti:Al₂O₃ Laser," Ishida et al, Reported in the proceedings of the Optical Society of America, Ultrafast Phenomena, May 14-17)

It should be noted that the laser shown in FIG. 5 produces highly stable mode-locked pulses that are relatively insensitive to variations in the length or alignment of the resonator. Thus, no complex and expensive active feedback techniques are necessary to stabilize the resonator.

Resonator Design Theory

In order to develop a resonator design which operates in accordance with the subject invention, a number of factors must be considered such as thermal lensing properties of the intracavity materials and astigmatic effects. These effects are considered when calculating the fundamental mode of the resonator using ABCD matrix methods. In order to obtain a solution for the mode of the resonator containing nonlinear materials the standard ABCD methods must be modified and extended to consider intensity dependent effects. These extensions to prior art will be described below.

In designing a mode-locked laser resonator based upon intensity dependent mode variations between CW and mode-locked (ML) operation it is necessary to simultaneously consider spatial, temporal and frequency domain effects. All three of these domains are intricately interrelated and at the heart of a description of each lies the intensity dependence of the index of refraction in nonlinear media. The lowest order nonlinear effects originate from the third order susceptibility $\chi^{(3)}$, which is responsible for nonlinear refraction. This intensity dependence of the refractive index resulting from the contribution of $\chi^{(3)}$ becomes $$n(\omega, I) = n_o(\omega) + n_2 I \qquad (1)$$

where $n_o$ is the linear part (given e.g., by the Sellmeier equation), I is the intensity of the optical field inside the nonlinear medium and $n_2$ is the nonlinear index coefficient related to $\chi^{(3)}$ by the relationship $$n_2 = \tfrac{3}{8} n \, [\chi^{(3)}]. \qquad (2)$$

The intensity dependence of the refractive index leads to a large number of interesting nonlinear effects including two which are particularly important to nonlinear resonator design, self-phase modulation (SPM) and self-focusing. SPM effects predominantly determine the temporal (and by Fourier transform-frequency) behavior and self-focusing effects determine the spatial behavior of short pulse beams propagating in a nonlinear medium. These two effects are in many respects coupled and both must be considered in the design of a nonlinear mode-locked laser resonator.

First we will consider the details of self-focusing effects and then follow with a discussion of SPM and its effects on the temporal evolution of pulses as well as its effect on the ultimate pulse shape obtained.

Self-Focusing—Propagation of a self-focusing astigmatic beam in a nonlinear medium Inspection of equation (1) indicates that for a beam with a non-uniform spatial profile entering a nonlinear medium, the refractive index of the medium will vary in proportion to the intensity I, of the field at each transverse position r, across the beam. If we describe the spatial dependence of the beam by a gaussian profile $$I(x,y) = P_p/A \, exp[-2r^2/w^2(x,y) \qquad (3)$$

where $P_p$ is the peak power of the pulse, $A = \pi \, w_x w_y =$ the beam area, $w_x$ and $w_y$ are the transverse radii of the beam along the major and minor axes of the astigmatic beam and $w(x,y)$ is the transverse radius along a radial vector r, centered on the beam axis. Applying this definition to equation (1) we get for the index of refraction $$n(\omega,x,y) = n_o(\omega) + n_2 \, P_p/A \, exp[-2r^2/w^2(x,y)]. \qquad (4)$$

A limited development of the exponential in this expression leads to the following approximation of the index variation $$n(\omega,x,y)=n_o(\omega)+n_2 P_p/A - 2 r^2 n_2 P_p/(A w^2(x,y)). \tag{5}$$

At this point it is useful to compare this equation to the standard equation for the index of refraction in a "duct". A duct is any dielectric medium which has a quadratic variation of its index of refraction, in this case with a maximum on axis. In general we will consider astigmatic ducts in which the quadratic curvature is different along the major and minor axes of the incident beam. The index variation along one axis has the approximated form $$n(r,z) = n_o(z) - \tfrac{1}{2} n_{duct}(z) r^2 \tag{6}$$

where $n_{duct}$ is the curvature of the index along the axis, that is $$n_{duct}(z) = -\delta^2 n(r,z)/\delta^2 r^2 \tag{7}$$

at r=0. The elements of the ABCD matrix for the duct are then given by $$\begin{aligned} A &= \cos(\gamma z) \\ B &= 1/n_0 \sin(\gamma z) \\ C &= -n_0 \gamma \sin(\gamma z) \\ D &= \cos(\gamma z) \end{aligned} \tag{8}$$

where $\gamma$ is defined by $$\gamma^2 = n_{duct}/n_o \tag{9}$$

Comparing the quadratic coefficients of equation (6), developed for any quadratically varying dielectric medium to equation (5), developed for a gaussian beam entering a nonlinear medium we see that a "nonlinear duct" can be constructed after noting $$n_{duct}(z) = 4 n_2 P_p/(A w^2(x,y)). \tag{10}$$

The focal power of the nonlinear duct is then given by $$f_{duct} = 1/(n_o \gamma^2 dz) = A w^2(x,y)/4 n_2 P_p dz \tag{11}$$

where dz is the length of the duct element along the beam propagation axis. Equation (11) is only valid in the limit of small dz and in practice one must utilize a split-step method with many small incremental sequential duct elements to calculate the beam propagation behavior through an extended nonlinear medium. The output parameters resulting from each step are then used as input parameters for the next duct step element. In general the increment step size along z is determined by the criteria that the beam diameter change be small across any particular step. Proper behavior is verified by ensuring that further decreases in the step size do not alter the final output beam propagation parameters. In this way the nonlinear propagation behavior inside the nonlinear medium can be calculated.

The approximations employed in the above development have validity for peak powers up to and in some cases, slightly above the critical power of the nonlinear medium. The critical power is defined as the power at which the focal power created by the self-focusing effect is exactly offset by the normal diffraction of the propagating gaussian beam. At this power the beam can be perfectly guided without increasing or decreasing its transverse radius as a function of propagation distance. Spatial effects for powers substantially above the critical power are very difficult to accurately predict and three dimensional beams above this power tend to catastrophically focus and filament, often causing serious optical damage to the nonlinear medium. It is therefore desirable in general to design resonators which operate at or below the critical power for the material. The critical power can be calculated by comparing equation (11) for the focal power of the nonlinear duct to the equation governing diffraction for a gaussian beam. For a gaussian beam the radius of curvature varies as $$R(z) = z[1 + (z_R/z)^2] \tag{12}$$

where $z_R$ is the Rayleigh range of the beam given by $\pi w_0^2/\lambda$, z is the distance from the beams waist, $w_o$ and $\lambda$ is the wavelength. At self-guiding conditions $z_R >> z$ and $R(z) = z_R^2/z$ and $1/R(z) = 1/f_{duct}$. Equating these two quantities we arrive at a critical power, $P_c$ of $$P_c = \lambda^2/8 \lambda n_2 \tag{13}$$

for a symmetrical beam.

If the dimensionality of the problem is reduced so that self-focusing occurs in only one transverse dimension then it is possible to achieve accurate solutions to the wave propagation equation for powers above the critical power as well. In this two dimensional case, at powers above the critical power, it is possible to observe the formation of spatial solitons. U.S. Pat. No. 4,928,282 describes a laser which is mode-locked using a spatial soliton technique. This technique, which requires that the laser be operated well above the critical power is of limited utility. The resonator is difficult to construct and design to efficiently extract energy from the gain medium. In contrast, the approach used in the subject invention wherein the spatial profile of the beam is varied in three dimensions, at or below the critical power, has many practical advantages over the spatial soliton technique.

The intensity dependent variation of the intracavity beam profile necessary to induce and or maintain mode-locking can be achieved by placing an appropriate nonlinear medium inside the laser resonator, usually within a tightly focussed arm (to achieve high intensities) such that the crystal length matches approximately 2 Rayleigh ranges of the resonator beam. In the case of laser pumped laser oscillators (like TiAl2O3) the condition of crystal length matching a few Rayleigh ranges of the resonator beam is already met for reasons of efficient gain extraction from that medium. In this special case it is possible to combine the function of the gain medium and the nonlinear medium, thus providing the laser gain and the mode-locking element within a single optical structure. The combined case requires that additional focusing effects introduced into the gain medium from thermal lensing induced by the pumping beam be incorporated into the beam propagation equations outlined above. As with the nonlinear self-focusing these effects are generally asymmetric since they are induced by astigmatic gaussian beams.

Propagation of an Astiomatic Beam in a Nonlinear Thermally Astiomatic Focusing Gain Medium In order to simultaneously include the effects of linear thermal lensing and nonlinear self-focusing, a modified version of the split-step propagation method described above is applied. As before, the nonlinear medium is segmented into a sufficient number of sequential elements of appropriate length. For each of these elements the focussing power of the element is taken to be a combination of the power from the nonlinear self-focusing effect and the power from the thermal lens created in this volume element by the pump beam absorption. The focal power of an astigmatic thermal lens created by an astigmatic pump beam can be calculated by methods described in copending patent application Ser. No. 07/527,013, cited above. The calculation of the propagation of a resonator beam through this complex structure therefore requires a knowledge of the input radius and radius of curvature of both the excitation (pumping) beam and the resonator beam. The focusing powers in the first element are calculated from these input beam parameters and the output beam parameters are utilized as input to the next focusing duct element. The calculation is then stepped along element after element, taking into consideration the diminishing intensity of the pumping beam as well as any astigmatism present. The fact that the output beam parameters from this multiple element duct structure depend nonlinearly upon the input beam parameters makes this a nonreciprocal structure. That is, if the output beam parameters just calculated above are propagated back through the structure in the opposite direction, the original input parameters will not be obtained. This demands that a self-consistent resonator mode solution must be obtained by applying an iterative technique.

In practice, the self-consistent resonator mode solution is obtained by beginning the calculation at "low peak power" by calculating the mode for zero or very low resonator beam peak power and using this mode as the starting approximation for the nonlinear resonator calculation. The low peak power mode transverse radius and radius of curvature can be calculated at the input to the multi-element duct in a given direction and the beam is then propagated through the nonlinear medium until the output beam parameters are achieved. These beam parameters are used to propagate the beam through the rest of the optical structures on the "output" side of the non linear element until it returns to the nonlinear structure again. The parameters at this point are then used to propagate the beam step by step back through the nonlinear thermal lensing duct until new beam parameters are achieved at the original input side of the nonlinear medium. The beam is next propagated through the optical structures in this end of the cavity and eventually brought back to the original input face of the nonlinear duct. This entire process is continued until the new input parameters into the duct meet some convergence criteria such as a less than one percent change in radius and curvature parameters from one iteration to the next. If the resonator has no stable self-consistent mode solution at the specified input peak power, pump power, and beam parameters then the iterative calculation will not converge.

With the calculational techniques outlined above it is possible to predict the three dimensional mode changes at any point within the optical resonator and to use this information to optimize the mode-locked operational behavior of the laser. To accomplish this optimization at least two important manifestations of self-focusing associated with mode-locking must be considered. The first is the effect of mode volume changes upon the differential gain between mode-locked and cw operation and the second is the effect of saturable absorption caused by mode volume changes which occur at the position of apertures intentionally placed within the resonator for the purpose of inducing mode-locking.

Differential Gain

A substantial driving force for mode-locking in preference to cw operation can be created by constructing an optical resonator in which the gain extraction is higher in the presence of self-focusing effects described above. An estimation of this effect can be obtained and mode-locking design criteria determined by calculating the single pass gain for a given resonator configuration for the low peak power (cw) mode and comparing this to the single pass gain for the mode which exists for the case of high peak powers (mode-locked). For $TiAl_2O_3$, under proper conditions, it is possible to cause the single pass gain mode-locked to be in excess of 10% larger than the single pass gain cw. The single pass gain for a particular mode depends upon the three dimensional overlap between the excited gain volume and the resonator mode volume. Resonators can be constructed in which the resonator mode mode-locked forms a substantially better overlap with the excited gain volume being created by the pump beam than does the cw mode.

FIG. 6 demonstrates this principle graphically by plotting the transverse radius of the various beams versus position within the $TiAl_2O_3$ crystal.

Figure 6A:
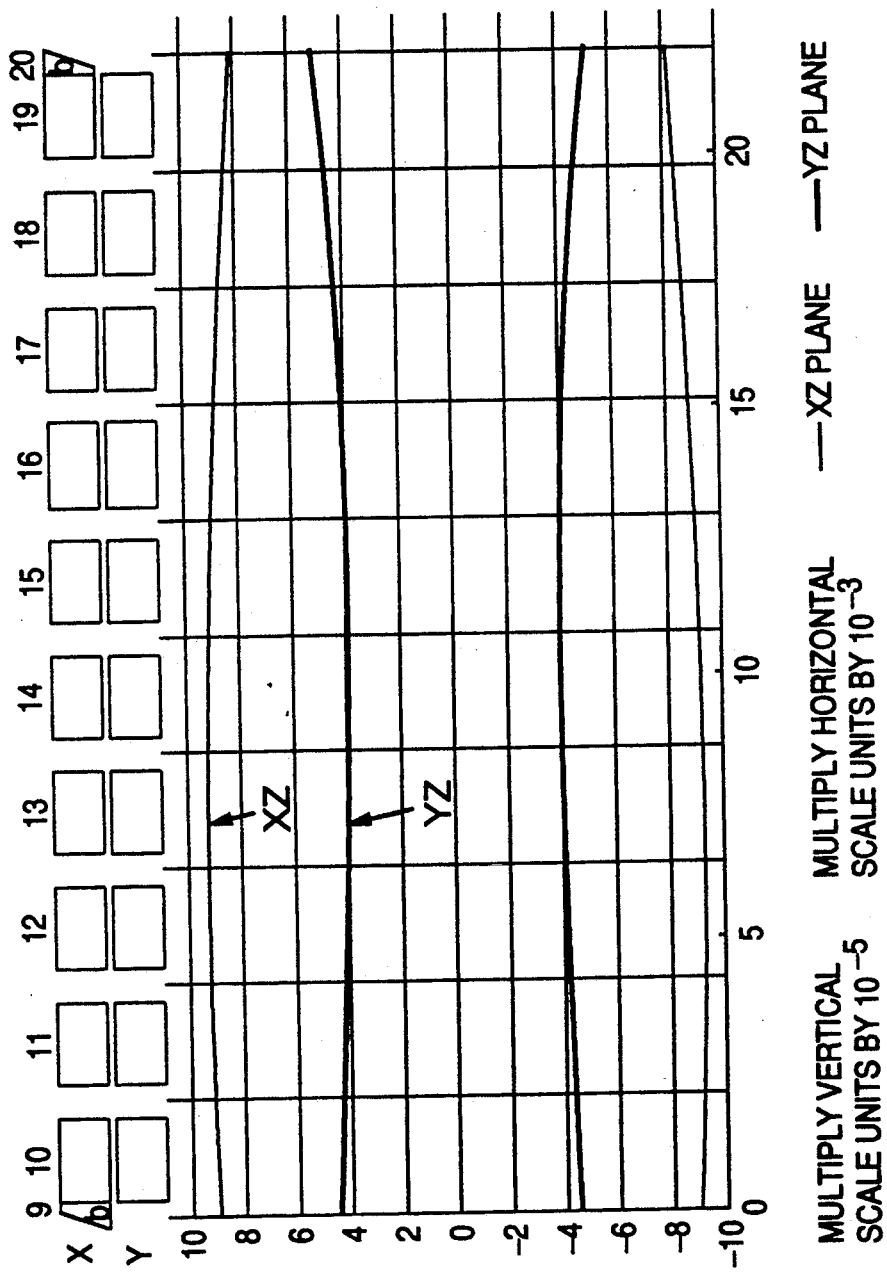
FIGS. 6a to 6c are a group of graphs plotting the transverse radius of various beams versus position within a titanium sapphire crystal.
Figure 6B:
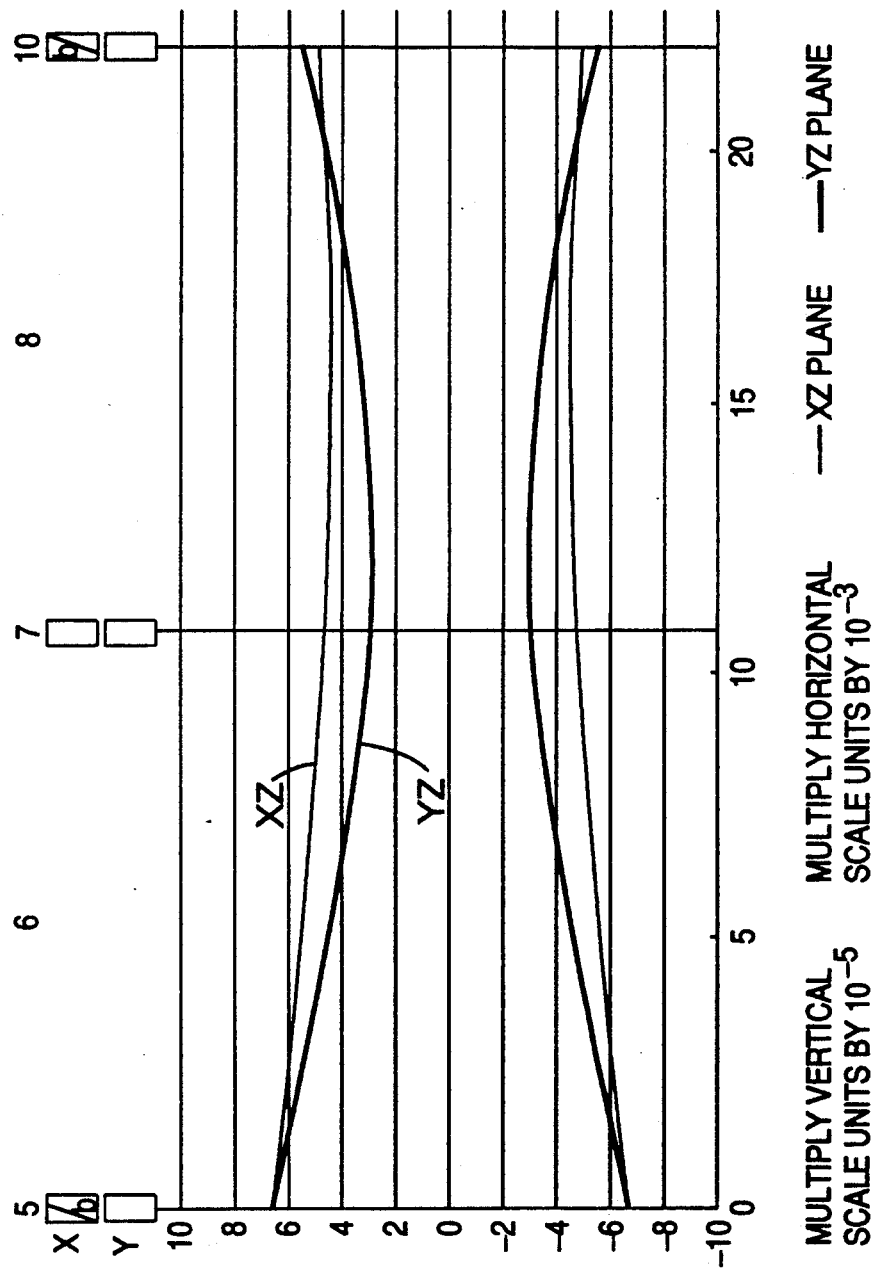
Figure 6C:
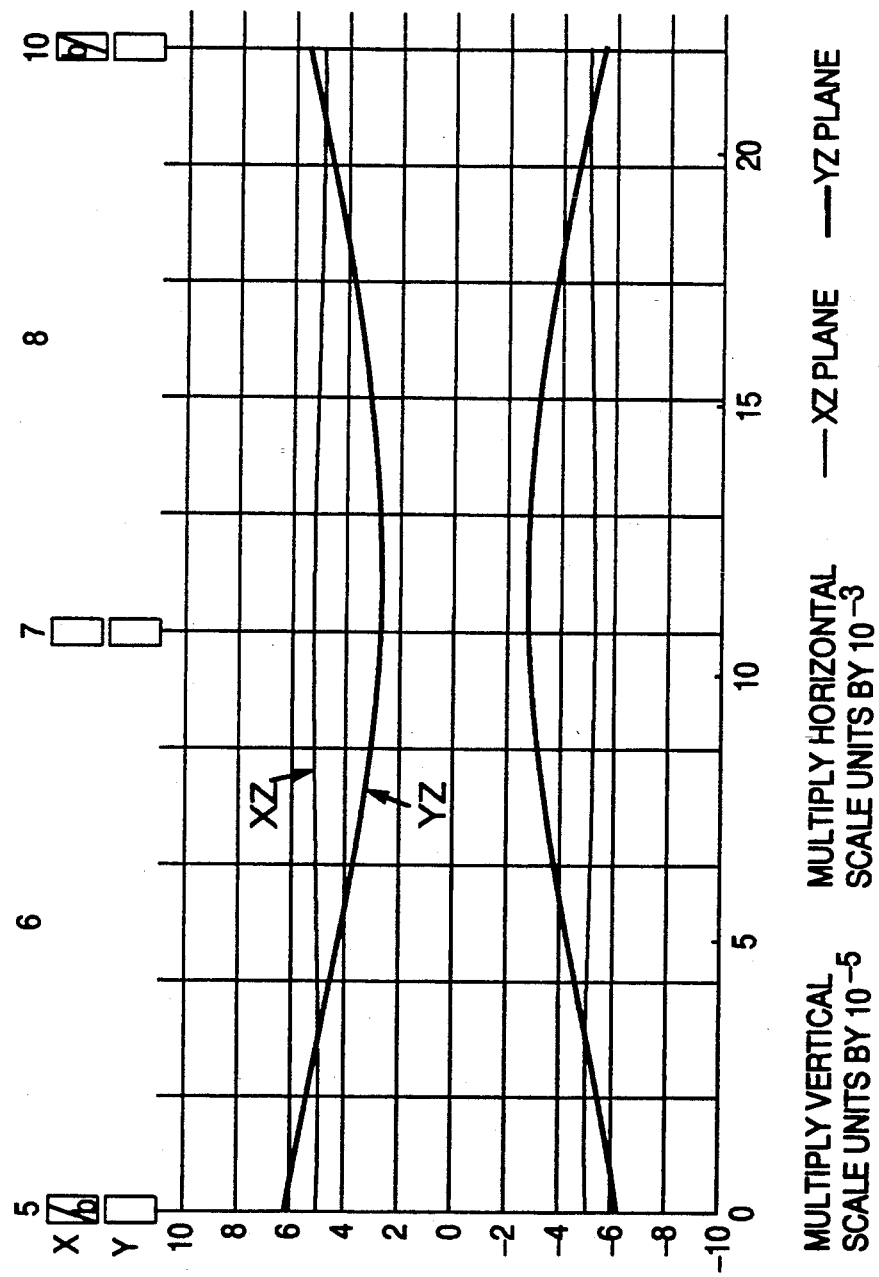

FIG. 6a shows the XZ and YZ propagation of the pumping beam which will be absorbed at a rate given by the absorption coefficient $\alpha$ of the crystal at the excitation wavelength, such that the power of the pump beam at position z from the input surface of the crystal will be $$P(z) = P(O) \exp[-\alpha z] \qquad (14)$$

where P(O) is the incident power on the crystal. From this equation and the XZ and YZ transverse radii the intensity distribution of the exciting beam is easily calculated at each position z by $$I(z) = (P(z)/\pi \; w_{xp} \; w_{yp}) \exp[-2(x^2/w_{xp}^2 + y^2/w_{yp}^2)] \qquad (15)$$

where $w_{xp}$ and $w_{yp}$ are the X and Y transverse radii of the pump beam at position z, respectively. FIG. 6b shows the self-consistent resonator mode for the case of 1 W peak power (cw). FIG. 6c shows the high peak power iterative solution obtained by the method described above for the mode-locked case for a peak power of 450 kW. As can be seen in this example the cw and the mode-locked modes are quite different in shape within the gain medium. For the example calculated herein an average pump power of 6 watts was assumed for a laser having the dimensions described with reference to FIG. 5. For this example, the ratio of the single pass gains for the cw and the mode-locked resonator modes was $$G(\text{mode-locked})/G(\text{cw}) = 1.11 \qquad (16)$$

demonstrating the potential for very large differential gains favoring mode-locked operation of the laser. By varying these distances, angles, pump conditions, crystal position, etc . . ., significantly different ratios can be observed.

Figure 7:
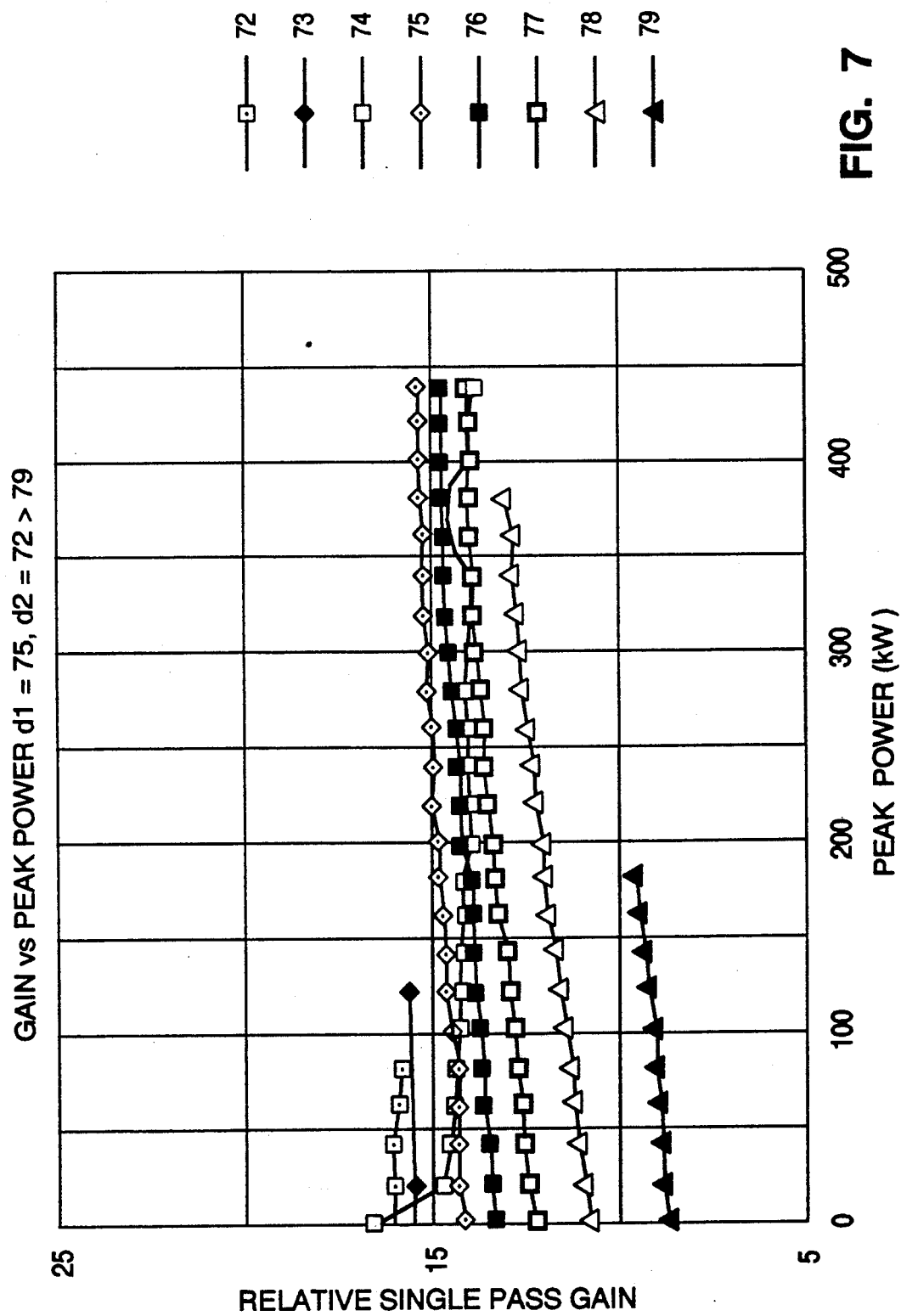
FIG. 7 is a graph which illustrates the single pass gain versus peak power for different resonator dimensions.

As an example of the sensitivity of the differential gain to various design parameters, FIG. 7 shows the relative single pass gain calculated for the above resonator as a function of peak power within the resonator and as a function of the distance $D_2$ in the range of 72-81 mm. For $D_2=72$, 73 and 74 mm the slope of the curve is actually negative with the mode-locked (high peak power) gain being lower than the cw (low peak power) gain. These are unfavorable design dimensions in which to observe mode locked behavior. For $D_2=75-81$ mm the differential gain favors mode-locking although at the longer distances (78 and 79 mm) the overall gain is lower. The optimum mode-locked stability is therefore limited approximately to $D_2=75-77$ mm, a small fraction of the total cw stability domain of this oscillator.

Saturable Absorption from Apertures

In addition to differential gain, the other important manifestation of self-focusing which must be considered in the optimal design of a mode-locked oscillator is the effect of saturable absorption created by mode volume changes which occur at the position of apertures strategically placed within the resonator to induce mode-locking. As discussed, the iterative nonlinear self-consistent resonator calculation approach allows the calculation of the transverse mode diameter at any location within the resonator for the beam propagating in either direction. Since the resonator contains a nonreciprocal element the beam can have a different radius at the same location depending upon which direction of propagation in the resonator is being considered. Taking these factors into account it is possible to define specific locations within the resonator at which the beam diameter is smaller when calculated for high peak powers compared to low. These locations become ideal for placing an aperture which effectively increases the round trip losses for the cw mode compared to the mode-locked mode. The loss differential created by these apertures can be very large and in general is intensity dependent—hence the analogy to saturable absorption.

Figure 8A:
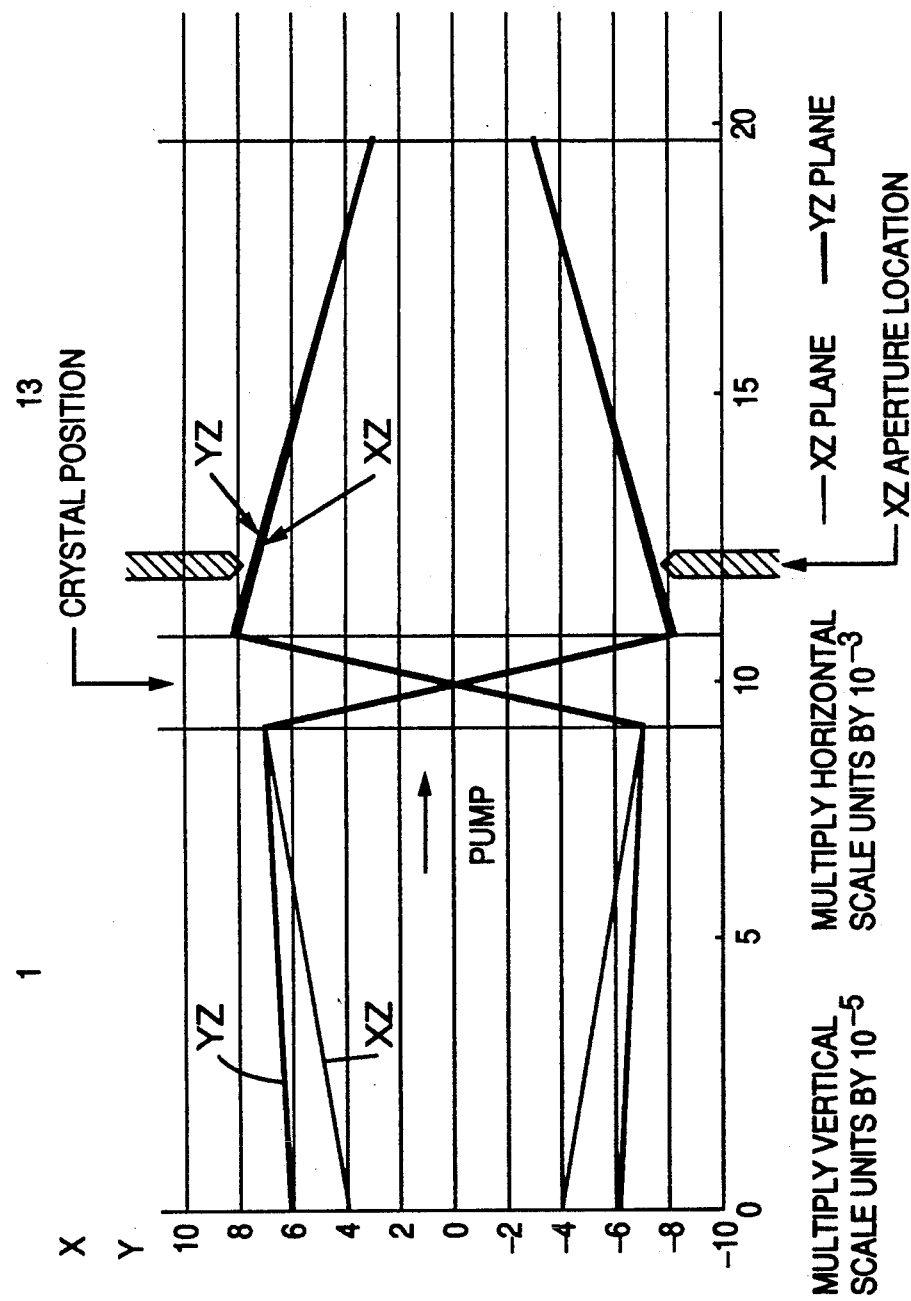
FIG. 8a is a plot of cw beam propagation through the resonator at low peak power.
Figure 8B:
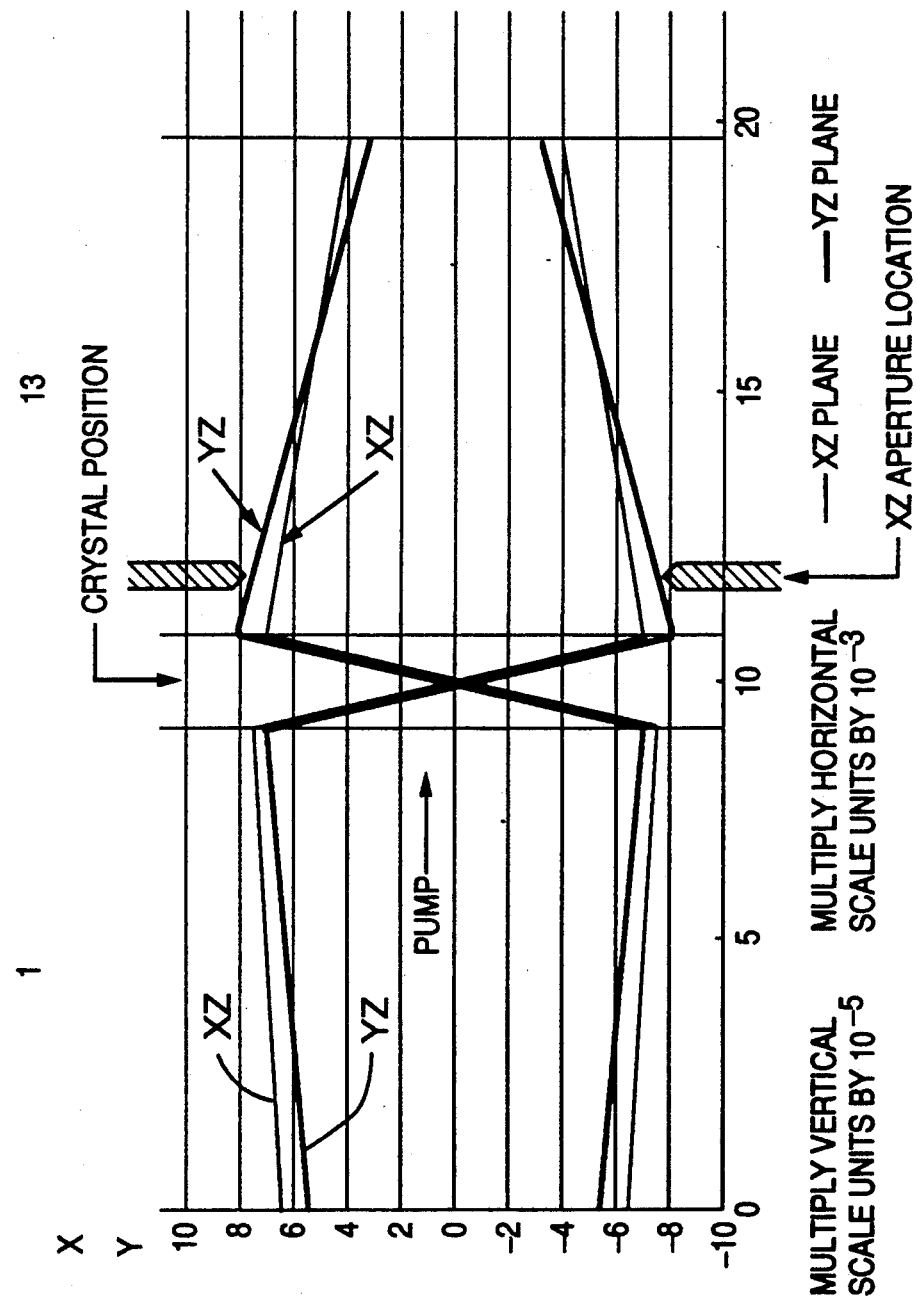
FIG. 8b is a plot of mode-locked beam propagation at a peak power of 450 watts.

FIG. 8a shows the XZ and YZ transverse radius of the resonator mode as a function of position within the resonator for the example described above with a value of $D_1=75$ and $D_2=77$ for the cw case. FIG. 8b shows the same information for high peak power (450 kW). Examination of these two plots indicates that at the curved fold mirror adjacent to the aperture the beam diameter drops from a value of 1.62 mm in the CW XZ plane to a value of 1.37 in the mode-locked XZ plane. Placement of a slit aperture near this location in the XZ plane induces and strongly stabilizes mode-locking.

Figure 9:
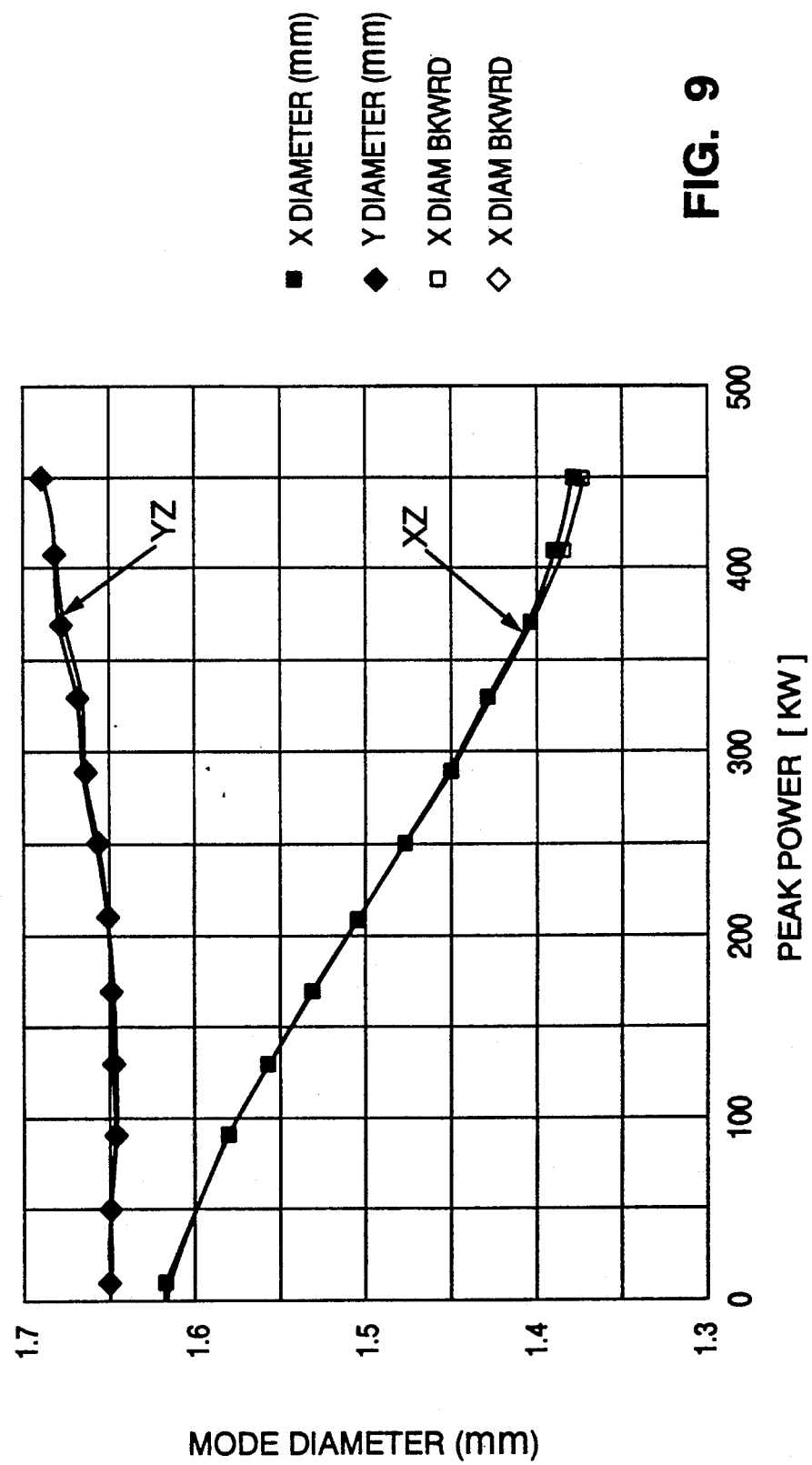
FIG. 9 is a graph illustrating the variation in mode diameter at a particular location within the resonator as a function of peak power.

FIG. 9 shows the behavior of the calculated mode diameter versus intracavity peak power for the beam in both directions and in both the XZ and YZ plane. As can be seen diameter changes from 1.62 mm down to 1.37 mm can be induced by raising the intracavity peak power from 1 W to 450 kW. This figure also demonstrates a beam expansion from 1.65 mm to 1.68 mm in the YZ plane. An aperture oriented in this plane would destabilize rather than stabilize mode-locked operation. This predicted behavior is observed experimentally.

Figure 10:
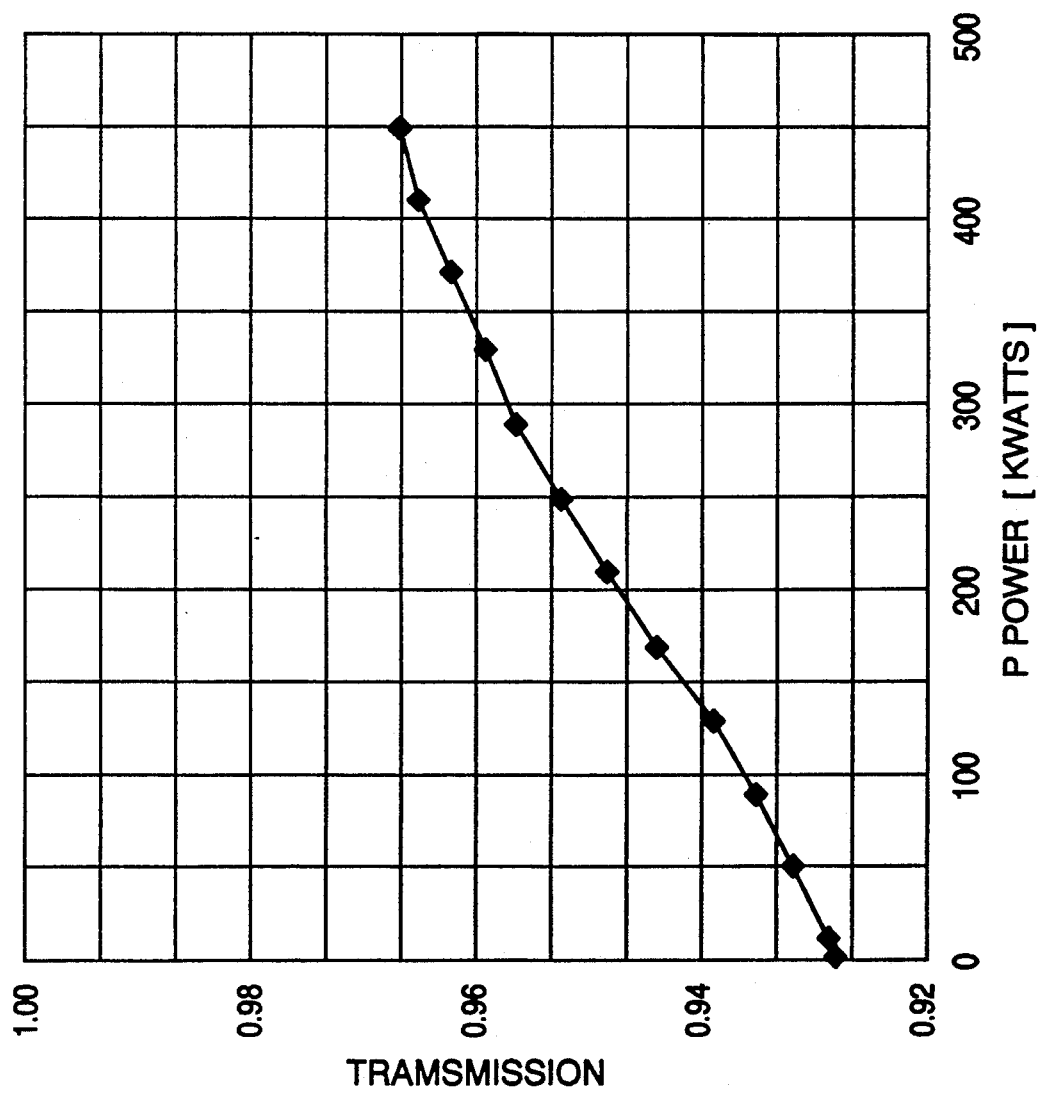
FIG. 10 is a graph illustrating the change in transmission created by a slit located as shown in FIG. 8 as a function of the intracavity.

FIG. 10 shows a calculation of the differential loss (transmission through the aperture) implied by this large beam diameter change upon mode-locking for a slit placed at the location shown in FIG. 8. The calculation was carried out for an XZ slit aperture width to CW XZ mode diameter ratio of 0.9. In this case it can be seen that the loss introduced by the aperture decreases from 7.2% for low peak power to 3.3% at 450 kW intracavity peak power.

Time Evolution and Propagation of Ultrashort Pulses Self-Phase Modulation

Self-phase modulation (SPM) refers to the self-induced phase shift experienced by an optical field during its propagation in a nonlinear medium. Its magnitude can be obtained by calculating the phase of an optical field given by $$\phi(\omega,I) = n(\omega,I) k_o L = (n_o(\omega) + n_2 I) k_o L \qquad (17)$$

where $k_o = 2\pi/\lambda$ is the wavevector, L is the interaction length in the medium and I is the intensity associated with the optical field. The intensity dependent nonlinear phase shift $\phi_{NL}$, given by $$\phi_{NL}(\omega,I) = n_2 k_o L I \qquad (18)$$

is due to SPM. SPM is responsible for spectral broadening of ultrashort pulses as well as the existence of optical solitons when it occurs in a structure which also provides anomalous dispersion (negative group velocity dispersion).

In the well known case of SPM generated in fibers, determining the interaction length is straightforward, L is simply the length of the fiber. For a freely propagating beam however, the intensity changes due to diffraction and calculation of the self induced non-linear phase requires integration of the intensity over the propagation distance. For a freely propagating beam it will generally be necessary to match the length of the nonlinear material to the spot size that the beam is focussed to in order to achieve a substantial phase shift. It can be shown that for a gaussian beam that $$\phi_{NL} = 8\pi/\lambda^2 n_2 P_p \arctan(L/Z_R) \qquad (19)$$

where $P_p$ is the optical peak power and $Z_R$ is the Rayleigh range of the beam in the non-linear medium. It is apparent from eq. (19) that a sufficient matching condition is achieved for $L = 2 Z_R$ since there is no significant increase in the non-linear phase for $L/Z_R > 2$. In order to generate significant SPM (on the order of 1 radian), either very high power or a very high nonlinear index is required. For example, for fused silica ($n_2 = 3.2 \times 10^{-16}$ cm$^2$/W) the peak power required to induce a 1 radian phase shift is $P_p = 540$ kW.

These peak power levels can easily be achieved in the pulsed operation of solid state lasers. The effect of SPM in the case of a pulsed source is to induce a nonlinear phase which is time dependent. As a consequence of the time dependent index of refraction which is introduced, the instantaneous frequency also becomes time dependent resulting in a chirped pulse. This chirp causes the overall bandwidth of the propagating pulse to increase. Under proper conditions the increased bandwidth can be utilized to achieve a shorter pulse by removing the chirp. For the case of normal SPM this can be done by propagating the pulse in a medium with negative group velocity dispersion ($-$GVD). Well known pulse compression techniques make use of either a grating pair or an arrangement of prisms to provide the required anomalous (negative) group velocity dispersion.

In a solid state laser the nonlinear index of the host is often similar to that of fused silica. For high power pulsed operation the peak power can reach multi megawatt levels and, although the length of the active medium is typically much shorter than the Rayleigh range, significant SPM can be observed. Indeed, it is often the case that laser resonators are carefully designed to try to minimize what are usually deleterious effects to performance and materials resulting from these power levels.

Similar peak power levels can be obtained for ultrashort pulsed operation of a mode-locked Ti-Sapphire laser. In this case the condition for maximum nonlinear phase shift is satisfied as a result of the relatively high pump intensity threshold which dictates that the pump and cavity beams must be tightly focused inside the active medium.

Temporal Soliton Pulse Formation

In general, a laser cavity can be designed in such a way that it contains either net positive or negative GVD (or in principle the GVD can be perfectly zeroed). The case of a laser cavity which has net negative group velocity dispersion is a special one. In this case, SPM can lead to soliton-like pulse shaping. This behavior has been predicted and observed in CPM lasers where the SPM (much lower than 1 radian) is provided by the ethylene glycol of the saturable absorber jet.

Soliton pulse shaping can result in pulse shortening as well as pulse stabilization effects in a mode-locked laser. Soliton pulse shaping is the mechanism responsible for the stable, short (sub-100 femtosecond) pulse operation of the Ti-Sapphire laser. In the embodiment shown in FIG. 5, a pair of high dispersion prisms 136 and 138 are introduced intracavity to provide negative group velocity dispersion. The sapphire rod has very high normal group velocity dispersion (roughly four times higher than fused silica) at the operating wavelengths. In order for soliton-like pulse shaping to take place, the net GVD from the combined action of prisms and laser rod must be negative. A second condition which will be discussed in more detail below is that the net bandwidth increase from SPM after a round trip must be zero.

For a soliton propagating in an optical fiber the chirp from the negative GVD precisely balances the chirp from SPM on a differential basis and the pulse propagates without bandwidth modifications. This precise compensation can be accomplished in optical structures which contain many discrete elements and this is the case referred to as soliton-like pulse shaping, or discrete soliton formation. For a discrete temporal soliton, the various processes take place in different materials and after a complete round trip the balance of all these transformations must leave the pulse unmodified in time as well as in frequency. This is possible because the effect of SPM on the bandwidth depends on the sign of the chirp. Normal SPM ($n_2>0$) increase the bandwidth for either unchirped or positively chirped pulses and will decrease the bandwidth for negatively chirped ones.

For the configuration described in FIG. 5 the pulse must have negative chirp going into the Ti-Sapphire rod after the prism sequence and positive chirp coming back from the output coupler. In this way, the bandwidth of the pulse will decrease on passage through the crystal toward the output coupler and increase while passing through in the return direction.

As the prism sequence (or whatever GVD compensation device is utilized) is adjusted such that the net negative GVD in the cavity is decreased the pulse width is seen to decrease while remaining nearly transform limited, and the average output power also decreases. When the net GVD approaches zero the pulsed behavior becomes unstable and eventually the system ceases to mode lock. This behavior is a very strong indication of soliton-like pulse shaping.

The nonlinear propagation equation (the nonlinear Schrodinger Equation) for a pulse traveling in a homogeneous medium does have a well known and exact soliton solution if the functional form of the pulse is given by a hyperbolic secant. For each value of net GVD there is a fixed relationship between pulse width and the amount of SPM which is a function of the peak power of the soliton $$P_{solition} = |\beta|/\gamma \tau^2 \qquad (20)$$

where $|\beta|$ is a parameter related to the GVD which is determined by the prism configuration and the nonlinear material properties, $\gamma$ is an SPM nonlinearity coefficient (proportional to n2) and $\tau$ is the FWHM of the pulse.

The shorter the pulse the lower the SPM, and therefore the peak power. The pulse width and power are ultimately determined by gain saturation to the dynamic loss at that pulse width. The peak power, however, will not exceed the limit set by the critical power which, for Ti-Sapphire, is on the order of 800 kW, since at the critical power and above the resonator losses become too high. If at the critical peak power the corresponding average laser power is too low to saturate the gain to the losses, the laser tends to double pulse or to develop a CW background.

Figure 11:
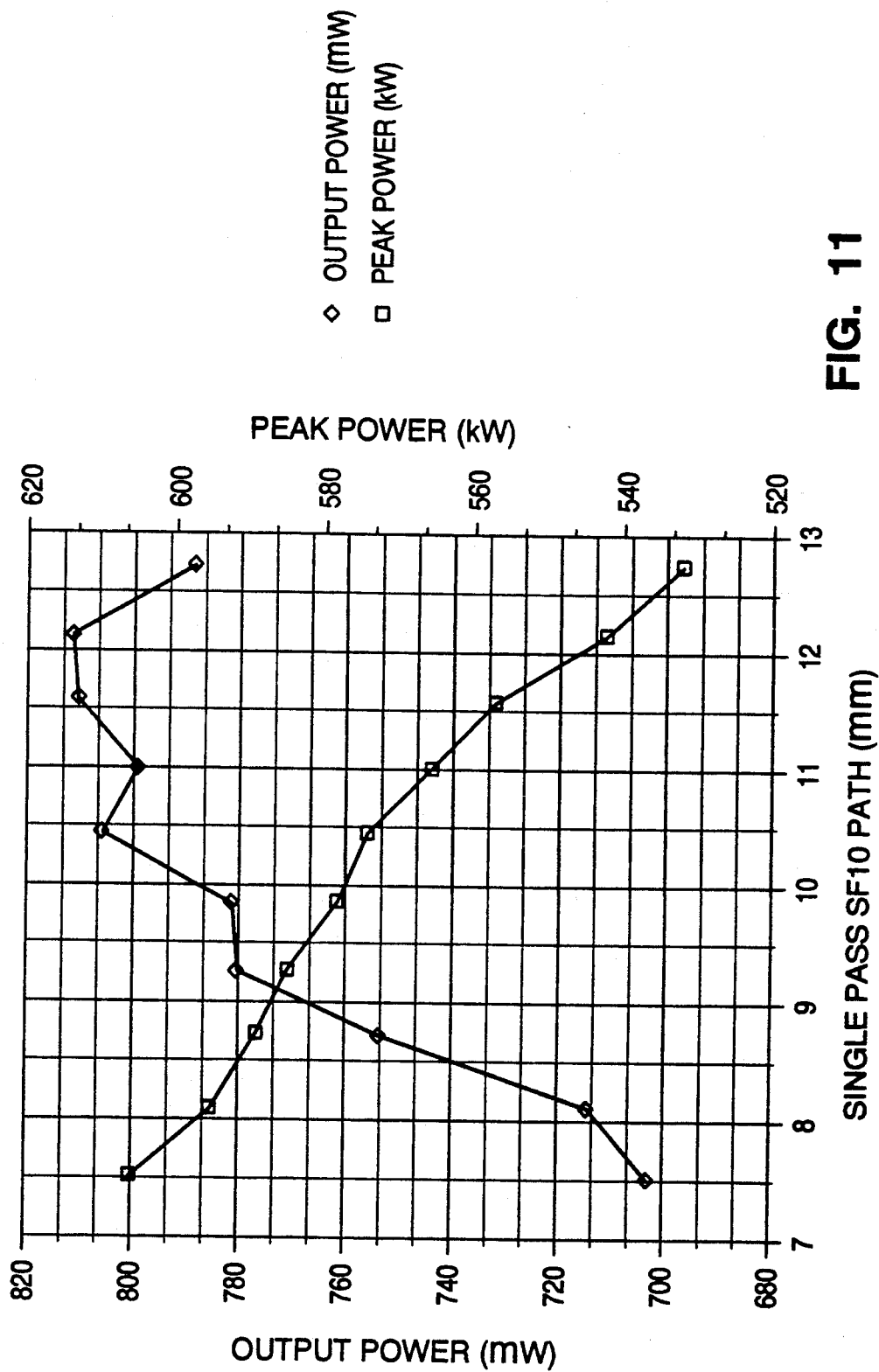
FIG. 11 is a plot of average and peak power as a function of path length through cavity prisms.

FIG. 11 demonstrates the average and peak output power of the laser shown in FIG. 5 versus a parameter related to $\beta$, the optical pathlength through the SF10 of the prisms. It can be seen that the peak power does not exceed the ~800 kW critical power for titanium sapphire and indeed levels off at approximately 620 kW. In this case it would be possible to extract higher average powers from this resonator which has been optimized for performance at approximately 600 kW by increasing the percent transmission of the output coupler and increasing the pump power. As long as this is done such that the intracavity power remains the same, then the pulse width will remain unchanged and thus so will the peak power. This technique should allow the output power to be scaled considerably higher.

A slit, located in the appropriate location and orientation within the resonator, provides fast saturable absorption in combination with self-focusing, stabilizing the power at a level consistent with the soliton mechanism. In this way stable, CW background free, pulses can be obtained.

This laser has been demonstrated to operate over a very wide range of wavelengths (>100 nm) without substantial readjustment after its initial adjustment. This is a considerable improvement over prior art techniques.

Initiation of Mode-locking Operation

As discussed above, in order to initiate mode-locking behavior, a short variation in the intensity of the propagating beam must be created. This variation can be induced by creating a fast perturbation in the length of the cavity. Such a change can be induced by translating the position of one of the resonator mirrors. While this approach will initiate mode-locking behavior, the extent of translation of the mirror and the velocity required can create alignment problems.

Accordingly, the path length change is preferably created by rotating an optical element in the path of the laser beam. FIG. 12 illustrates the most basic variation of this approach. In FIG. 12, the resonant cavity is defined by end mirrors 202 and 204. A gain medium 206 is located in the cavity. A transmissive optical element 208 is mounted in the cavity. In order to minimize losses, the plate should be oriented at Brewster's angle. If another angle is desired, suitable antireflection coatings can be used.

A means, such as a galvanometer (not shown), is provided to rotate the element 208 so that the path length of the beam through the element is changed. By varying the path length, the oscillating cavity modes are scanned with respect to the fixed wavelength dependent cavity losses such that a fluctuation in beam intensity is created. The speed and extent of the movement must be sufficient to prevent saturation of the gain by a single cavity mode. It is believed that this approach may be useful for initiating mode-locking behavior in passively mode-locked lasers other than the self focusing laser described herein.

While the rotation of a single transmissive optical element as shown in FIG. 12 will be sufficient to create the path length change required to initiate mode-locking behavior, it has certain drawbacks. More specifically, as the element is rotated, the position of the beam will change, thus varying the alignment of the laser. Accordingly, it would be desirable to design an assembly which maintains the alignment of the beam in the cavity as the element is rotated.

One such approach is shown in FIG. 13 wherein a pair of optical elements 210 and 212 are utilized. In this approach, the two elements are oriented such that beam enters the elements at the same angle of incidence. In the resting position, the elements are oriented at Brewster's angle for maximum transmission. In order to initiate mode-locking behavior, both of the elements are rotated simultaneously, by equal angular amounts, and in opposite directions. By this arrangement, the position of the beam exiting the pair will not change. In addition, the change in path length per degree of angular variation of the elements will be twice that of the arrangement shown in FIG. 12.

FIG. 14 illustrates the approach used in the commercial embodiment of the subject invention. The laser is substantially as shown in FIG. 5 with the initiation mechanism being inserted between mirror 118 and the end of the cavity.

As in FIG. 13, two optical elements 230 and 232 are utilized. In this embodiment, the elements are connected and driven by a single galvanometer aligned with the axis of the connection. This approach is lower in cost than the approach shown in FIG. 13 since it relies on only one galvanometer. In addition, there is no need to insure the that two independent drivers have the same amplitude and are synchronized.

In order to insure that angle of incidence for both optical elements is the same, the orientation between the optical elements 230 and 232 must be set so that angle 234 is equal to twice the angle of incidence 236 of the beam on the intermediate mirror 238. At rest, the angle of incidence of the beam with respect to both the elements is Brewster's angle. As the assembly is rotated, the path of the beam between the optical elements 230 and 232 and the mirror 238 will vary but the alignment of the beam with respect to mirror 118 and the filter 126 will remain the same.

Fused silica can be used to form the transmissive optical elements 230 and 232. However, fused silica has a series of absorption bands in the region between 935 and 960 nm. Accordingly, if laser operation in that region is desired, a different material, such as Infrasil, available from Heraeus-Amersil, Inc., can be used to form the optical element. While the elements 230 and 232 are shown as two pieces connected together, it would be possible to form the assembly out of a single block of transmissive material properly cut and polished.

In order to initiate mode-locking behavior, a drive signal is sent to the galvanometer. In the preferred embodiment, the oscillation frequency is approximately 50 Hz which is selected to match the mechanical resonance of the assembly. By this approach, the extent of motion generated by the galvanometer is maximized for a given input energy. The rotation of the optical elements in this manner creates a total path length change of about 300 microns per millisecond. Mode-locking behavior can be induced within a few milliseconds. Once mode-locking behavior has been initiated, the galvanometer is stopped so that the optical elements will be set at Brewster's angle with respect to the circulating beam.

Another approach for initiating mode-locking behavior is illustrated in FIG. 15. This approach is related to a technique described in copending application Ser. No. 513,798, filed Apr. 24, 1990, and incorporated herein by reference. In the latter application, a Michelson interferometer structure was used to initiate and maintain mode-locking behavior. In this case, the Michelson structure is used only to initiate the mode-locking behavior and then is removed from the cavity.

As seen in FIG. 15, a transmissive optical element 250 is located in the path of the beam, preferably at Brewster's angle. A galvanometer (not shown) is utilized to change the angular position of element 250. An additional mirror 252 is located outside the resonant cavity. Mirror 252 is mounted to a PZT driver 254.

In order to initiate mode-locking behavior, the galvanometer is used to shift the angular position of element 250 so that a portion of the beam is deflected out of the cavity and subsequently reflected back into the cavity by mirror 252. This extra branch path, in combination with the beam path defined between element 250 and end mirror 114, defines a Michelson interferometer structure. The PZT is used to translate the position of the mirror 252 and vary the path length of this branch path.

Translating the position of mirror 252 functions to scan a window of loss across the gain curve of the laser such that a fluctuation in intensity of the circulating beam is created. Once the mode-locking behavior is induced, the galvanometer is used to return the optical element to Brewster's angle so that no light is directed towards the mirror 252 and the Michelson structure is removed from the cavity configuration. At this time, the drive voltage to PZT 254 can be turned off.

It should be noted that unlike the movement of the optical elements in FIGS. 12 through 14, the speed or extent of the movement of element 250 is not critical. Rather, it is the movement of mirror 252 that must be controlled. In experiments, it has been found that mirror 252 can be translated at a frequency between 5 KHz and 100 KHz. The extent of the path length change should be less than the wavelength of light being generated and is preferably less than one half of that wavelength. It should be noted that the change in path length achieved by the translation of the mirror is twice the distance of travel of the mirror so that a translation distance of 0.25 of a wavelength is equivalent to a path length c of 0.5 of a wavelength.

In summary, there has been provided an all solid state passively mode-locked laser. The laser includes a resonant cavity having a gain medium therein. A transmissive element is also located in the cavity and is formed from a material which varies the two dimensional lateral spatial profile of the beam with respect to intensity due to self-focusing based on the Kerr effect. The resonator is arranged such that the round trip gain of the system is increased with respect to the intensity of the beam so that mode-locking operation can be achieved. In one approach, the variation in the spatial profile is used to increase the extraction of the energy from the gain medium. In another approach, the variation in spatial profile which occurs with an increase in intensity is used to decrease the loss in the system so that pulse operation is favored. In an illustrated embodiment, wherein the gain medium is formed from titanium-sapphire, the self-phase modulation of the crystal is also used to compress the pulses into the femtosecond range. In addition, a prism set can be used to balance the group velocity dispersion and self-phase modulation of the gain crystal to achieve stable, soliton-like operation. In the preferred embodiment, mode-locking behavior is initiating by rotating a transmissive optical element located in the cavity in a manner to vary the path length of the beam.

While the subject invention has been described with reference to preferred embodiments, various changes and modifications could be made therein, by one skilled in the art, without varying from the scope and spirit of the subject invention as defined by the appended claims.

We claim:

1. A device for initiating mode-locking in a passively mode-locked laser, including a passively mode-locked laser said passively mode-locked laser further including a resonant cavity, a gain medium located in said cavity and a means for exciting the gain medium to generate a laser beam, said device comprising:
   a transmissive optical element mounted within said cavity in the path of said laser beam; and
   means for rotating said optical element in a manner to vary the path length of the beam in the cavity whereby oscillating cavity modes are scanned with respect to fixed wavelength dependent cavity losses, such that a fluctuation in beam intensity is generated until mode-locking is initiated.

2. A device as recited in claim 1 wherein said optical element is oriented at Brewster's angle after mode-locking has been initiated thereby producing maximum beam transmission.

3. A device as recited in claim 1 wherein said optical element is AR coated.

4. A device as recited in claim 1 further including a second transmissive optical element driven by said rotation means, said device further including a mirror positioned to direct the beam passing out of the first optical element back into the second optical element with the second optical element being connected to the first optical element at an angle selected so that the beam passes through both elements at the same angle.

5. A device as recited in claim 4 wherein said optical elements are oriented at Brewster's angle after mode-locking has been initiated thereby producing maximum beam transmission.

6. A device as recited in claim 4 wherein said path length change induced by the rotation of said optical elements is on the order of 300 microns per milliseconds.

7. A device for initiating mode-locking in a passively mode-locked laser, including a passively mode-locked laser, said passively mode-locked laser including a resonant cavity, a gain medium located in said cavity and a means for exciting the gain medium to generate a laser beam, said device comprising:
   a transmissive optical element mounted within said cavity; and
   a mirror located outside said resonant cavity;
   means for translating the position of the mirror; and
   means for changing the angle of the optical element so that a portion of the beam is reflected out of the cavity towards said translating mirror and back to define a scanning interferometer configuration in combination with the cavity said scanning interferometer configuration functions to scan a window of loss across a gain curve of the laser such that a fluctuation in intensity is generated, said scanning interferometer configuration being maintained thereby initiating mode-locking.

8. A device as recited in claim 7 wherein said optical element is oriented at Brewster's angle after mode-locking has been initiated thereby producing maximum beam transmission.

9. A device as recited in claim 7 wherein said mirror is translated at a frequency of 5 KHz to 100 KHz.

* * * * *